US008145265B2

(12) United States Patent
Pawlecki et al.

(10) Patent No.: US 8,145,265 B2
(45) Date of Patent: Mar. 27, 2012

(54) METHOD AND SYSTEM FOR PRODUCING HARD COPIES OF ELECTRONIC INFORMATION EMPLOYING A PORTABLE PERSONAL RECEIVING DEVICE

(75) Inventors: J. Brent Pawlecki, New York, NY (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 650 days.

(21) Appl. No.: 12/330,620

(22) Filed: Dec. 9, 2008

(65) Prior Publication Data

US 2010/0144376 A1 Jun. 10, 2010

(51) Int. Cl.
*H04M 1/00* (2006.01)

(52) U.S. Cl. .................................... 455/554.2

(58) Field of Classification Search ............... 455/550.1, 455/554.2, 556.2, 557
See application file for complete search history.

(56) References Cited

U.S. PATENT DOCUMENTS

| 6,745,253 | B2 * | 6/2004 | Struble ........................... 710/10 |
| 7,515,937 | B2 * | 4/2009 | Lee ................................ 455/557 |
| 7,570,939 | B2 * | 8/2009 | Culbert .......................... 455/410 |
| 7,904,113 | B2 * | 3/2011 | Ozluturk et al. ............. 455/556.1 |

OTHER PUBLICATIONS

Roy, M., "House Tests Digital Mail System" Feb. 11, 2004—www.internetnews.com/xSP/article.php/3311251.
Cote, C., Press Release: Pitney Bowes Intends to Collaborate on Delivering Its dMail(TM) Solution Via Microsoft's Cloud Platform—Oct. 27, 2008.
MAILCOM, "MailCode Launches d-mail Digital Mail Delivery with Imaging Business Machines and IAC; d-mail provides Digitization, Management and Delivery of Inbound Mail" Atlantic City, May 20, 2002.
MarketWatch, "Pitney Bowes Launches dMail(TM) Executive Mail Management Solution at the AIIM on Demand Conference and Exposition" May 17, 2005, pp. 1-4.
Winick,L. "The Insider" 48 Linn's Stamp News, Nov. 10, 2003.
"Pitney Bowes Launches dMail Solution, Mail:" The Journal of Communication Distribution, Jun. 2005.

* cited by examiner

*Primary Examiner* — Jeffrey Zweizig
(74) *Attorney, Agent, or Firm* — George M. Macdonald; Charles R. Malandra, Jr.; Steven J. Shapiro

(57) ABSTRACT

A method for producing hard copies of electronic information employing a portable personal receiving device includes the steps of selecting information to print and utilizing the receiving device to identify available printers based on the location of the receiving device for printing the selected information in hard copy form. The portable receiving device is connected to one of the available printers and the selected information is printed in hard copy form. A system for producing hard copies of electronic information employing a portable personal receiving device includes a portable receiving device having a program enabling selection of information to print. The portable device includes a program to identify available printers based on the location of the receiving device. A communications link connects the portable receiving device to an available printer. The receiving device may be a cell phone and global positioning satellite functionality and/or cell phone tower positions may be employed to determine the location of the receiving device.

16 Claims, 4 Drawing Sheets

METHOD AND SYSTEM FOR PRODUCING HARD COPIES OF ELECTRONIC INFORMATION EMPLOYING A PORTABLE PERSONAL RECEIVING DEVICE

FIELD OF THE INVENTION

The invention disclosed herein relates generally to a method and system for producing hard copies of electronic information employing a portable personal receiving device and, more particularly, to a method and system for producing hard copies of electronic information employing a cell phone and location determining functionality.

BACKGROUND OF THE INVENTION

When people travel for work or for personal reasons, it is difficult for them to receive their delivered postal mail at their new location and other physically printed documents. They may retrieve their mail upon their return with the potential for missed opportunities, deadlines and the like or employ other available services such as mail forwarding.

Mail forwarding typically involves physical mail that can be forwarded to a new physical address such as by the United States Postal Service (USPS) or other carrier which implements a recipient initiated change of address. Communications such as email can be sent from any location and received at any location on a computer or cell phone. Also, electronic attachments which may reside on an external server or be downloaded to a cell phone can be sent from any location to a computer or cell phone and received at any location by a computer or a cell phone. Moreover, commercial digitized mail process services can scan physical mail and documents and then send them from any location by electronic mail and can be received at any location by a computer or cell phone.

Prior systems have involved, for example, receiving physical documents and scanning the documents to provide digitized electronic images of the material. The digitized image of the material such as postal mail and other documents, hereinafter referred to as mail, are electronically stored and available to the recipient at a remote location via various communication methods between the electronic storage faculty and the user. This involves the user having access to a computer capability which either receives the electronically stored material or an indication of the type of material being stored for access by the user via the user's locally employed computer. The material is received by email or by accessing a remote server where the material is electronically stored. Upon accessing the mail electronically, the user may print the material on a local printer. For example, the user may receive an email with the material attached to the email and thereafter print the material as is common with received emails. The computer is connected to a local printer or a networked printer which is configured for the user's preferences and the material is thereafter printed. For networked printing, the user may have a secure password which is required when the user seeks to print the material at the printer. In such case the file is transferred from the user's computer to the printer where it is stored along with the password or preset password. The user retrieves the printed material upon entering the appropriate password into the printer which enables the printer to print the transferred file.

A commercial service for providing digital mail "dMAIL" is operated by Pitney Bowes Inc. This system is the dMAIL Executive Mail Management Solution service. The service enables users to gain access to scanned and indexed documents from any location within reach of an enterprise network including remote connections from anywhere in the world. Digitizing the mail helps facilitate the delivery of that mail to both home office and offsite. Other services have involved the scanning of incoming mail which is place on disks which disks are then shipped to a location for distribution to the mail recipient. The mail may be scanned into a server that is then immediately available for electronic distribution. The system may make each scanned piece of mail a separate document and allows for sorting, keyword searches and the ability of remote locations to access mail. These services can be services where physical mail is opened, scanned on a scanner and relayed by email to the intended recipient. Alternatively, the recipient may be notified that the email is available for download from the web.

While the above systems provide benefits to mailers and mail recipients, they require access to a computer to be able to receive and thereafter print the electronically stored image of the physical item. Although computers are widely available, computer availability may be a problems while people are traveling or otherwise do not have access to a computer, as for example, employees who travel or work from locations that do not have computer and printer capability. Another example of such problem is access to physical mail during dislocations due to events such as a pandemic or natural catastrophe such as storms or floods. All of the foregoing poses challenges to a virtual workforce and others who need access to mail.

Thus it is a desirable to provide a system and method which enable more flexibility in remotely receiving communications in electronic format and, thereafter, when needed or desired, locating an available printer for printing such electronic communication.

SUMMARY OF THE INVENTION

It has been discovered that cell phones can be used for as a gateway device to provide continuous availability and flexibility for the delivery of mail in electronic form. It has been further discovered that the cell phone can be employed in providing the ability to locate available printers for printing the electronically stored materials. This is particularly beneficial since a cell phone user may be in a location where the user is not aware of an available printer for printing the materials. It has been discovered that the cell phone can function to help locate and identify available printers in a locale within defined distances from the cell phone or which meet other attributes and that the printer can be controlled by the cell phone to print the electronically stored material. The material can be stored electronically in the cell phone or on a remotely accessible server.

It is an object of the present invention to provide flexibility in remotely receiving communications or notification of the availability of such communications in electronic format and, thereafter, when needed or desired, locating an available printer for printing such electronic communications.

A method for producing hard copies of electronic information employing a portable personal receiving device embodying the present invention includes the steps of selecting information to print and utilizing the receiving device to identify available printers based on the location of the receiving device for printing the selected information in hard copy form. The portable receiving device is connected to one of the available printers to print the selected information in hard copy form and the selected information is printed in hard copy form.

A system for producing hard copies of electronic information employing a portable personal receiving device embodying the present invention includes a portable receiving device having a program enabling selection of information to print. The portable device includes a program to identify available printers based on the location of the receiving device. A communications link connects the portable receiving device to an available printer.

In accordance with an embodiment of the present invention the receiving device is a cell phone and global positioning satellite functionality is employed to determine the location of the receiving device.

In accordance with yet another embodiment of the present invention the receiving device is a cell phone and cell phone tower positions are employed to determine the location of the receiving device.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts in the various figures.

DETAILED DESCRIPTION OF THE PRESENT INVENTION

Figure 1:
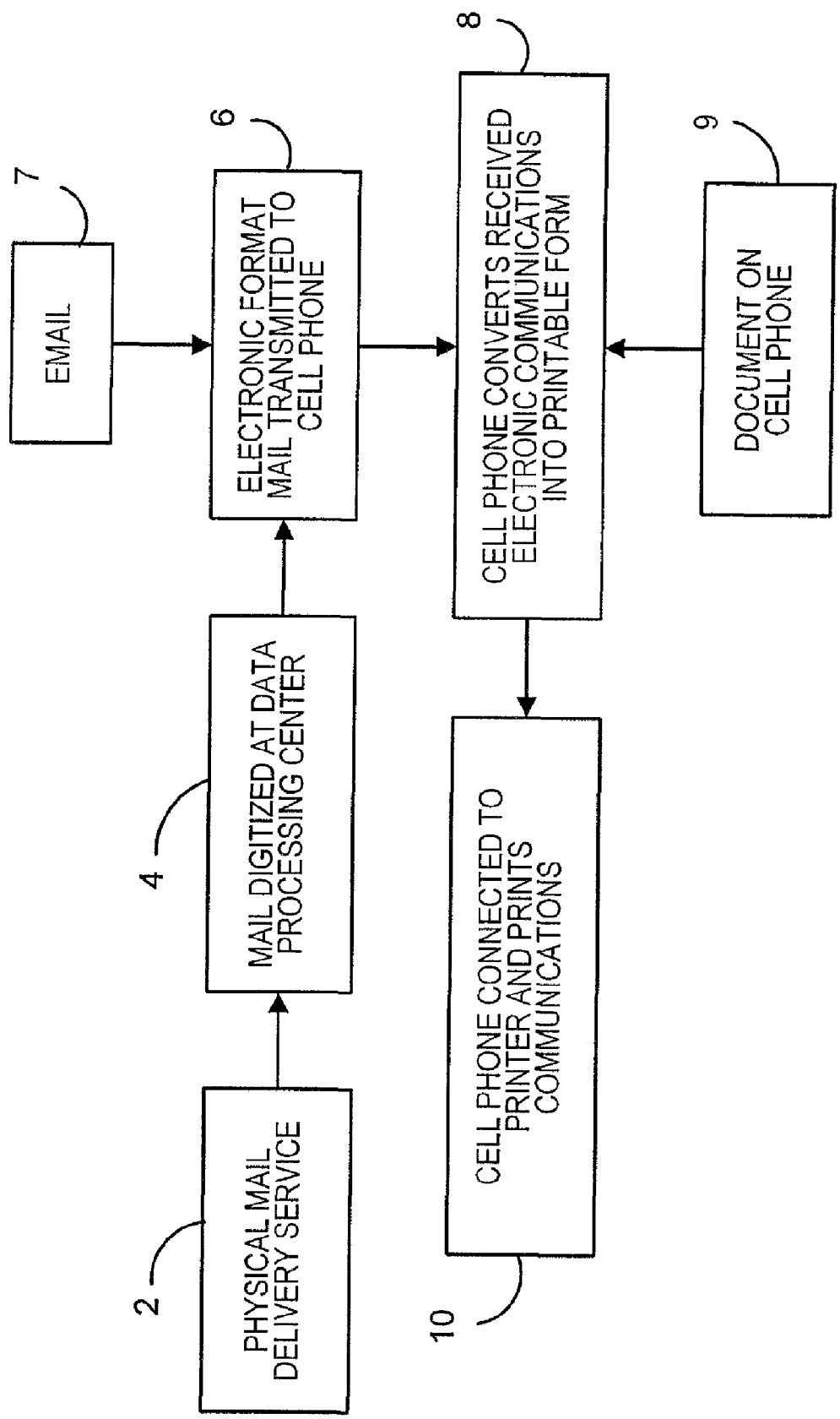
FIG. 1 is a block diagram of a personal remote access of mail employing cell phones embodying the present invention and showing the basic operation of the system.

Reference is now made to FIG. 1. Physical mail is delivered by a delivery service at block 2 to a recipient. For the purpose of this application it should be recognized that the term mail or documents includes all documents of any type and physical items having information thereon that is susceptible of being delivered and processed to be digitized or put into other electronic format for later transmission. Mail is digitized at block 4 at a data processing center such as a Pitney Bowes dMAIL systems center. One such service is operated by Pitney Bowes Inc. where physical items are put into electronic form and then transmitted to recipients by email or put into a format on a website that can be remotely accessed by a recipient. The digitized electronic format mail is transmitted to a cell phone at block 6. This may also be email as shown at block 7. The cell phone at block 8 processes the received electronic communications to convert the received electronic documents into a printable form. The received electronic communication may also be documents on a cell phone as shown at block 9.

The functionality of the cell phone, in a manner hereafter explained, is first used in a process to identify a locally available printer by determining the location of the cell phone. The cell phone is then connected to a locally available printer selected by the user to locally print the electronic mail in hard copy form at block 10. For the purpose of this application it should be recognized that the term documents includes all types of information the cell phone can process to convert the received information into printable form. This includes digitized mail, email including email attachments and documents on a cell phone. The hard copy form is the printing of the received information on media such as sheets of paper to recreate the documents. The content of communication, that is, the original mail delivered by the carrier at block 2, the e-mail at block 7 and the documents on a cell phone at block 9, may be recreated in hard copy form by the printer at block 10. Thus, as explained in greater detail below, a cell phone can make contact with a printer and print any of the various document types.

Figure 2:
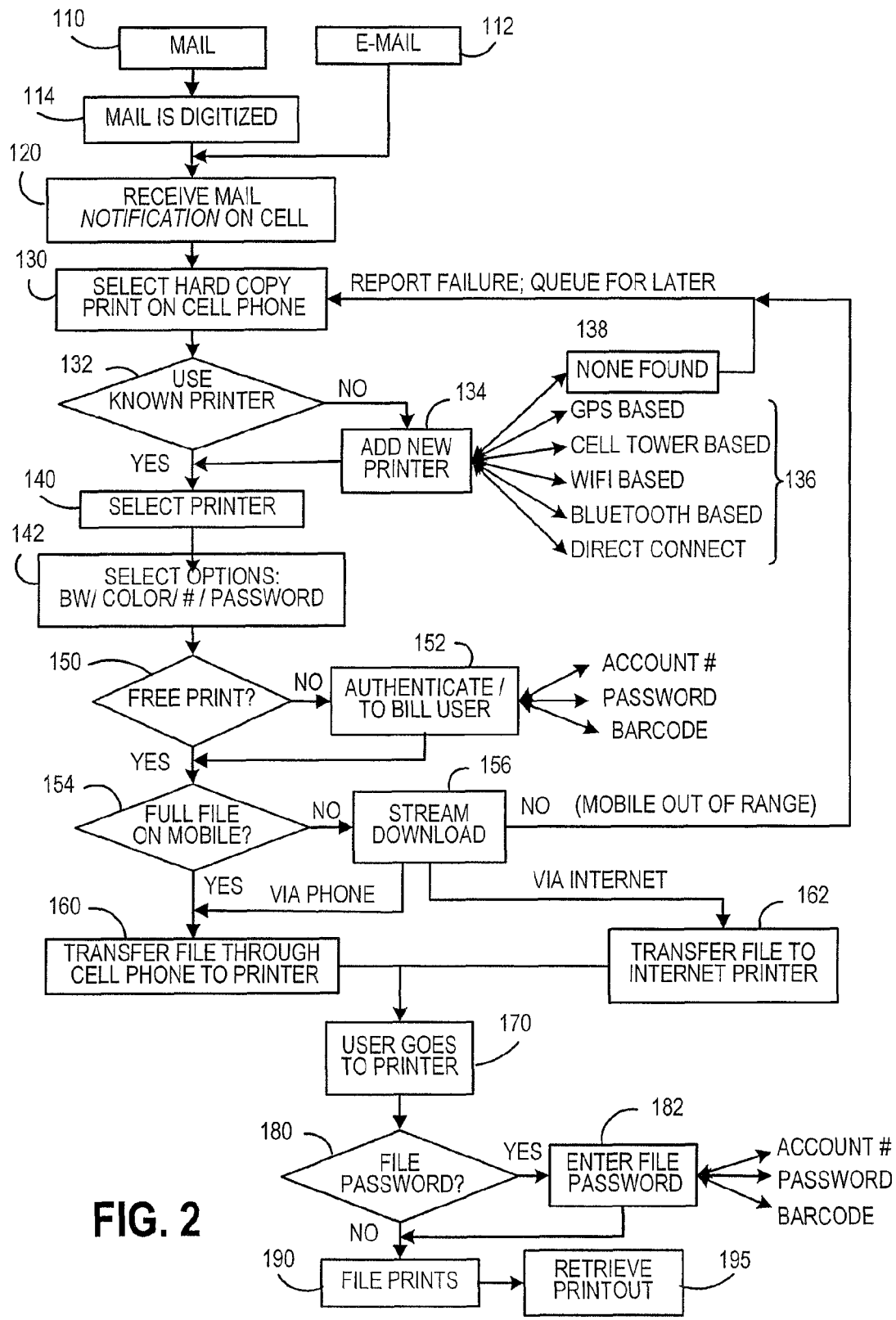
FIG. 2 is a detailed flow chart of the operation of the system for personal remote access of mail employing cell phones shown in FIGS. 1 and 3.

Reference is now made to FIG. 2. Physical mail is received at block 110, for example, by a data center and is digitized to be in electronic form at block 114. The digitized mail from block 114 and email from block 112 are received in electronic form or notification of the availability of such mail is received in electronic form on a cell phone at block 120. At block 130 a user selects on the cell phone hard copy print to initiate the process where the received electronic file documents or notification are to be printed. At block 132 a determination is made if a known printer is available to use. If this is the case the process continues at block 140 where a particular printer is selected. However, where no known printer is available to the user, the process continues at block 134 where a new printer is added when it is found through the processes shown at area 136.

The processes for connecting an available local printer can be by a direct connection where the user takes the cell phone to and physically connects the cell phone to a local printer. The new printer can be connected by a Bluetooth based process where a local printer is first identified by and then connected with a Bluetooth type connection to the new printer. A Bluetooth type connection involves is a local wireless communications protocol which communicates directly between physical devices in close proximity such as a computer to a printer or a cell phone to a printer. A device such as a computer or a suitable equipped cell phone would broadcast a request which would be detected and responded to directly by a printer. The new printer can be also be connected by a WiFi based process where a local printer is first identified by and then connected with a WiFi type connection to the new printer. A WiFi type connection involves a wireless communications protocol which creates a local area network and allows devices to access a local area network for communications. If a computer to which a cell phone is connected had information about the locations of available printers, computer could be queried through the internet and report back results on a WiFi link to the cell phone.

Where the above processes are unavailable or do not result in the identification of a locally available printer, global position satellite (GPS) or cell phone tower based identification means can be employed. The GPS functionality on the cell phone is employed in identifying the location of the cell phone. The GPS functionality involves several satellites to determine location. Thereafter, using the location of the cell phone, available printers in the locale are identified from a list of available printers in the area or by accessing a web site. The location of these printers can be communicated to the cell phone and limited to those available printers within the locale and further limited to those available printers within the locale and within a predetermined or cell phone user determined distance from the cell phone. The GPS location information is combined with directory information to determine available printers within a such determined distance of the location of the cell phone. The longitude and latitude of the GPS located cell phone can be calculated and compared with the longitude and latitude of available printers to provide a list of the nearest available printers to which the cell phone user had access permission.

Where the GPS function is not available, cell phone communication towers can be employed to determine the location of the cell phone although the global location may not be as specifically defined as with GPS. The location of the cell phone through a cell tower based system employ services such as the Google Maps MyLocation function to provide the location of the cell phone and that location can thereafter be used to identify available printers in the locale. These systems use the location of the tower or towers to which the cell phone is connected. Google MyLocation cell tower global location is a rough, less precise location than GPS. The cell phone user would likely need to select from a list of available printer locations such as where the cell phone user is in a hotel, in a railroad station, in an airport or in some other type location.

Lists of available printers in various locations may be compiled by different commercial and governmental services. These services can be provided on a commercial basis or free, particularly for use during times of emergency when people are dislocated. Where no printer is found, at block 138 the system loops back and reports a printer available failure and the electronic file for printing of the hard copy is queued for later printing when the cell phone is moved to another location where an available printer may exist.

Continuing with the process, at block 140 a printer is selected as previously noted and at block 142 various printer options may be selected such as black and white printing, color printing, number of copies to be printed and the like which is currently available on various print menus on computers. A determination is then made at block 150 whether the printing is free, that is whether the printing can be implemented without charge or authentication. Where this is not the case the process continues at block 152 where the user is authenticated and they may be billed for the printing service. The authentication can be by means of a barcode, a pass code or an account number. Where the authentication is by barcode, the barcode can be displayed on the display of the cell phone and scanned by the printer to provide the necessary authentication for the printing. The pass code or account number can be entered on the printer keyboard.

The process continues at decision block 154 where a determination is made whether the full print file is stored on the cell phone or whether the file on the cell phone is a notification of available material to be printed. This can also be notification of attachments to emails which are not stored on the cell phone. Where the full file is on the cell phone, the process continues at block 160 where the file is transferred from the cell phone to the printer for printing. Where the full file is not on the cell phone, the process continues at block 156 where the information may be downloaded in a stream and transferred directly through the cell phone to the printer for printing. This is particularly useful in cases where the cell phone does not have sufficient memory to store the information and is used as a conduit from the download server through the cell phone and to the printer. Where the printer intended to print the hard copy is connected to the internet and is available for connection to the server having the information to be printed, the information stream download at 156 can be controlled by the cell phone to go directly to the printer as shown at block 162 rather than through the cell phone showed at block 160.

At block 170 the user goes to the printer to complete the print and retrieval process. And, at decision block 180 a determination is made whether a file password is necessary to access the printer and cause the printer to print the files. Where this is not the case, at block 190 the printer prints the file and the printout is retrieved at block 195. However, depending on the configuration the printer can print the files prior to the user going to the printer if such security or confidentiality is not involved. In such case, the file is retrieved at block 195. However, where a password is required, at decision block 180 the password is entered into the printer to initiate the printing process. This can be done in a manner similar to that described in connection with block 152 where a barcode, pass code or account number can be employed. When the file is transferred from or through the cell phone or is directed for download by the cell phone to the printer, the cell phone can provide a secure access password to the printer which precludes others from initiating printing and provides a security vehicle for assuring unauthorized printing does not occur.

Figure 3:
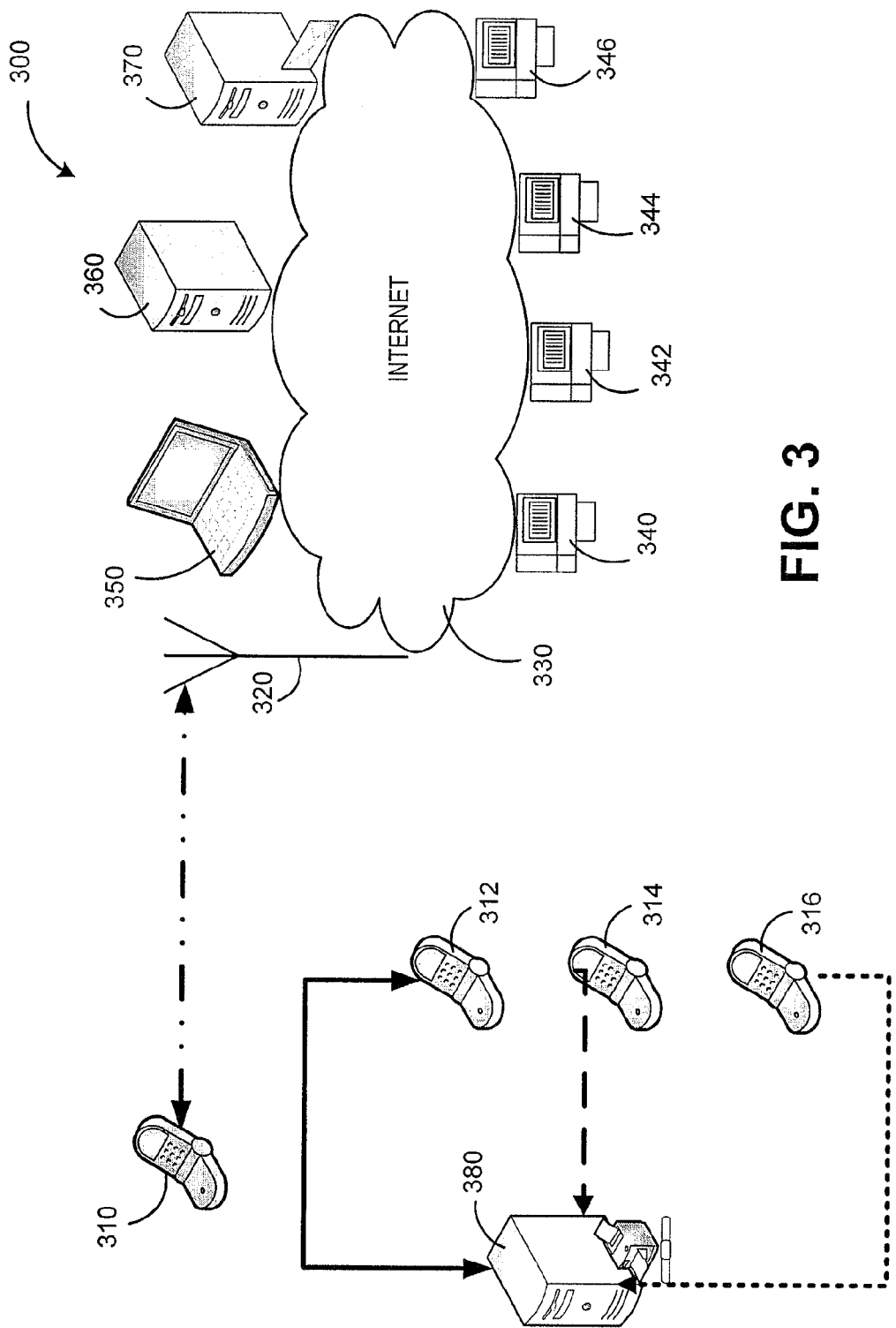
FIG. 3 is a diagrammatic view of the system for personal remote access of mail employing cell phones showing various aspects of the present invention; and, FIG. 4 is a block diagram of a cell phone having various features useful in the system for personal remote access and printing of mail shown in FIGS. 1-3.

Reference is now made to FIG. 3 which shows various forms of implementation of the present invention. Cell phones 310, 312, 314 and 316 may be connected to the various printers shown through different paths. Cell phone 310 is connected through the cell tower connection 320 and the internet 330 to the printers 340, 342, 344 and 346. Cell phone 312 is connected via a hard wire connection to the computer printer 380. Cell phone 314 is connected by Bluetooth type connection to the computer printer 380. Cell phone 316 is connected by a WiFi wireless type connection to the computer printer 380. Before connection, the cell phones may employ the processes described in connection with FIG. 2 to identify and locate locally available printers that can be employed to print the desired hard copy.

In one implementation of the present system, a correspondent using computer 350 would send an email from the computer 350 across the internet 330 to an email server 370 which would route the message to a network server 360 and thereby through the cell phone tower 320 to transmit the email to the cell phone 310. If the user of cell phone 310 desired to print a hard copy of the email message, the cell phone could transmit a print request through the cell phone tower 320 and internet 330 to the network server 360 and email server 370 to send the email message to a designated previously located and identified printer such as printers 340, 342, 344 or 346. Alternative approaches include connecting the cell phone 312, 314 or 316 through hard wired, Bluetooth type or WiFi type wireless connections, as the case may be, in the manner previously described, to print the email on computer printer 380.

Cell phone 310 is shown connected to the cell phone tower 320 while cell phones 312, 314 and 316 are not. This is because for the printing configuration for cell phones 312, 314 and 316, these cell phones do not have to be connected to the cell phone tower at the time of printing unless streaming of the file through the cell phone is employed as was described at block 152 shown in FIG. 2. With streaming of the information through the cell phone, the complete communication, nevery full resides on the cell phone. It passes through the cell phone while enroute to the printer. Segments of the complete communications sequentially pass through the cell phone. This allows for large size documents to be printed even where the memory capacity of the cell phone is insufficient to store the complete communication, document to be printed in hard copy form. Notification of the availability of the communication or a portion of the communication being communicated to the cell phone is sufficient for the system for personal remote access of mail employing cell phones to enable the complete communication to be accessed and printed.

Cell phones 310, 312, 314 and 316 may have a GPS functionality which enables the location of the cell phone to be determined. In such case, the digitizing service may transmit to the cell phone the location of available local printers such as computer printer 380 or internet connectable printers 340, 342, 344 and 346. Moreover, these printers, if they are moveable to different locations, may themselves have a GPS functionality on them which allows a data center to track the position of the printers as they are moved into different locations and update the availability of printers for any specific locale. As previously noted, the position of the cell phones that do not have GPS functionality can be determined by the cell phone towers to which the phones are connected employing services such as Google Map MyLocation function. This employs one or more cell phone towers to locate the general area in which the cell phone is located.

Mobile phones 310, 312, 314, and 316 store the electronic information to be printed on the phone in a format recognizable by the printer such as an ASCII type format. This can be used to cause the printer to recognize and print the file when so commanded by the cell phone. Various print drivers can be loaded onto the phone to enable the implementation of the specialized print features and to further enable the printing of, for example, graphic information.

Figure 4:
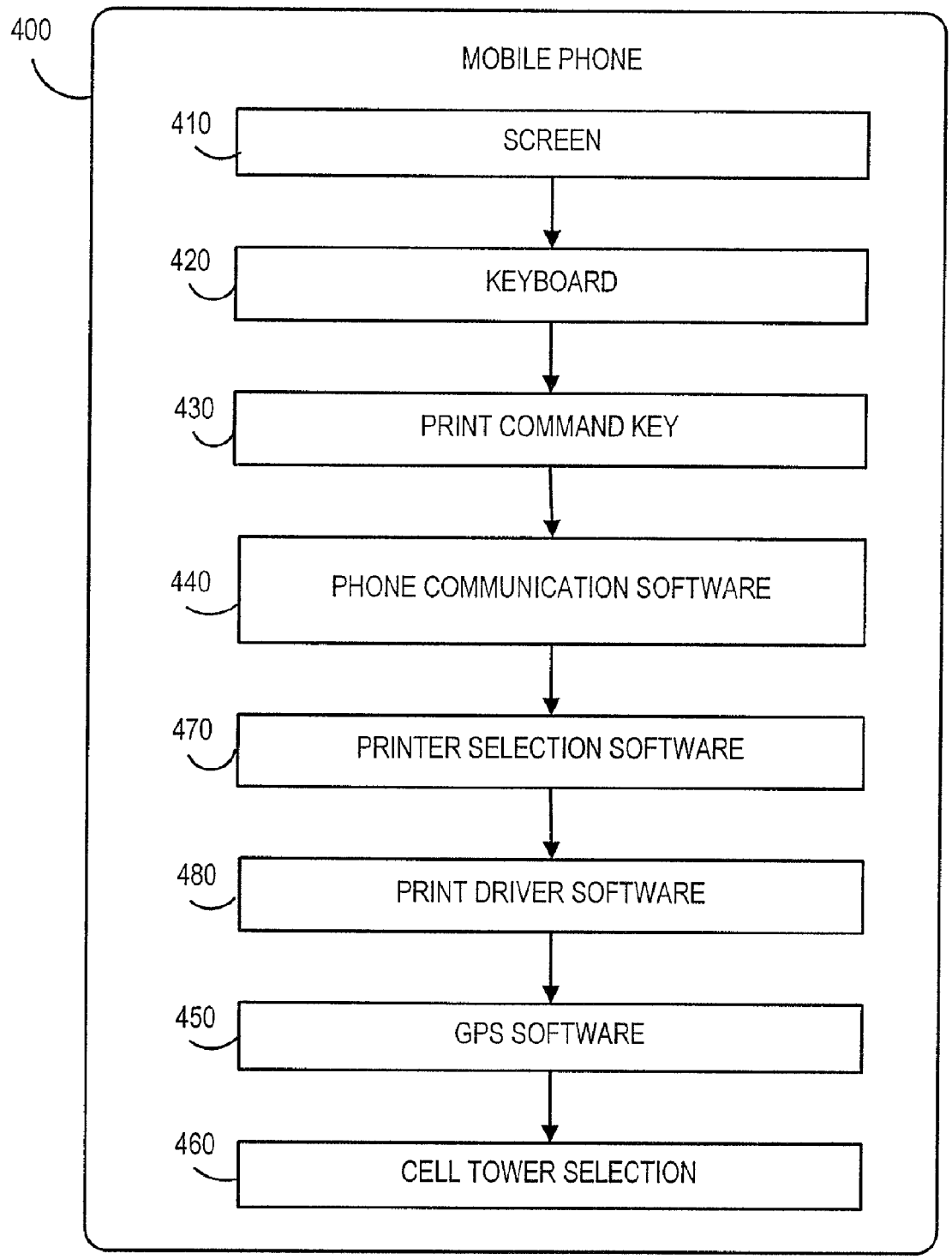

FIG. 4 is a diagrammatic representation of a mobile phone suitable for use with the present invention. Mobile phone 400 includes a screen 410, a keyboard 420 with various keys which may include a separate print command key 430. The mobile phone 400 includes software associated with the operation of the phone including phone communication software 440, GPS software 450 for position locating, cell tower selection software 460 as well as software specific to the new print functionality including printer selection software 470 and print driver software 480. The print selection software and print driver software may be similar to the types of software found on computers used to select a printer and to drive the selected printer to print.

The system for personal remote access of mail employing cell phones cell phone enables cell phones to link to printer and print content and also enables cell phones to link to the internet and redirect remote content to a printer where some of the content may never have resided upon the cell phone. Printer selections also can involve a cell phone being connected to previous used printers from, for example, a list of such printers. Where GPS functionality precisely identifies nearby candidate printers or cell tower location such as that employing Google MyLocation roughly localizes the cell phone location and identifies possible printers nearby. The cell phone user knowledge of the specific environment enables the user to select intelligently—e.g. the user is in the hotel and not in a train station. The cell phone user may then physically attach the cell phone to a nearby available printer such as by a hard wire or other type connection. Additionally, the cell phone may call into the environment such as by using a Bluetooth type connection and ask an available printer to reply. The list of available printers can be organized as desired such as on the basis of distance from the cell phone location, the cost of printing copies, the speed of the printers, the capability of printing in color and any other printer attributes.

The present system while described in connection with cell phones can also employ other personal portable devices of various types in addition to cell phones with various degrees of functionality depending on the features on such personal portable devices. For example, personal portable devices such as a personal digital assistant (PDA) or Blackberry type device can be used in addition to cell phones as a gateway device to provide continuous availability and flexibility for the receipt of digitized documents which can thereafter be printed when a locally available printer is identified. As used herein the term electronic version is intended to include the conversion of the information into electronic form and includes digitized electronic information and other forms of electronic information storage other than solely digital format; for example, the analog storage of a fax device in scanning an original document copy where the information may be transmitted to a cell phone and thereafter printed on a locally available printer.

While the present invention has been disclosed and described with reference to a single embodiment thereof, it will be apparent, as noted above those variations and modifications may be made therein. It is, thus, intended in the following claims to cover each variation and modification that falls within the true spirit and scope of the present invention.

What is claimed is:

1. A method for producing hard copies of electronic information employing a portable personal receiving device comprising the steps of:

selecting information to print;

utilizing said receiving device to identify available printers based on the location of said receiving device for printing said selected information in hard copy form;

connecting said portable receiving device to one of said available printers to print said selected information in hard copy form; and printing said selected information in hard copy form, wherein said receiving device connects to said one of said available printers through the Internet.

2. The method for producing hard copies of electronic information employing a portable personal receiving device as defined in claim 1 wherein the receiving device is a personal digital assistant.

3. The method for producing hard copies of electronic information employing a portable personal receiving device as defined in claim 1 wherein the personal portable device is a cell phone.

4. The method for producing hard copies of electronic information received by a portable personal receiving device as defined in claim 1 wherein a complete communication is received by said portable device.

5. The method for producing hard copies of electronic information received by a portable personal receiving device as defined in claim 1 wherein said selected information is a complete communication and a portion of said complete communication are sequentially received by said portable device and passed through said receiving device enroute to said one of said available printers until said complete communication is printed.

6. The method for producing hard copies of electronic information employing a portable personal receiving device as defined in claim 1 wherein a notification of a complete communication is received by said portable device and said selected information is said complete communication and wherein said step of connecting said receiving device to said printer is by said receiving device implementing a remote transfer of said complete communication to said one of said available printers.

7. The method for producing hard copies of electronic information employing a portable personal receiving device as defined in claim 1 wherein said receiving device uses global positioning satellites to determine location of said receiving device with respect to said available printers.

8. The method for producing hard copies of electronic information employing a portable personal receiving device as defined in claim 1 wherein the locations of said available printers are known to a user of said receiving device.

9. The method for producing hard copies of electronic information employing a portable personal receiving device as defined in claim 1 wherein said receiving device connects to said one of said available printers through a WiFi type wireless communication and wherein said one of said available printers is a local network printer.

10. The method for producing hard copies of electronic information employing a portable personal receiving device as defined in claim 1 wherein said receiving device connects to said one of said available printers through a Bluetooth type local wireless communication.

11. The method for producing hard copies of electronic information employing a portable personal receiving device as defined in claim 1 wherein said receiving device connects to said one of said available printers through a hardwired connection.

12. A method for producing hard copies of electronic information employing a portable personal receiving device comprising the steps of:
   selecting information to print;
   utilizing said receiving device to identify available printers based on the location of said receiving device for printing said selected information in hard copy form;
   connecting said portable receiving device to one of said available printers to print said selected information in hard copy form; and
   printing said selected information in hard copy form,
   wherein said receiving device uses cell phone tower positions to determine location of said receiving device with respect to said available printers.

13. The method for producing hard copies of electronic information employing a portable personal receiving device comprising the steps of:
   selecting information to print;
   utilizing said receiving device to identify available printers based on the location of said receiving device for printing said selected information in hard copy form;
   connecting said portable receiving device to one of said available printers to print said selected information in hard copy form; and
   printing said selected information in hard copy form,
   wherein said receiving device connects to said one of said available printers through a cell phone tower.

14. A method for producing hard copies of electronic information employing a portable personal receiving device comprising the steps of:
   selecting information to print;
   utilizing said receiving device to identify available printers based on the location of said receiving device for printing said selected information in hard copy form;
   connecting said portable receiving device to one of said available printers to print said selected information in hard copy form; and
   printing said selecting information in hard copy form,
   wherein global position satellite location information is combined with directory information to determine said available printers within a determined distance of the location of said receiving device.

15. A method for producing hard copies of electronic information employing a portable personal receiving device comprising the steps of:
   selecting information to print;
   utilizing said receiving device to identify available printers based on the location of said receiving device for printing said selected information in hard copy form;
   connecting said portable receiving device to one of said available printers to print said selected information in hard copy form; and
   printing said selecting information in hard copy form,
   wherein an authentication code is utilized to prevent said printing until said authentication code is entered into said printer,
   wherein said receiving device communicates said authentication code to said printer, and
   wherein said authentication code is a barcode communicated by said receiving device to said printer.

16. A system for producing hard copies of electronic information employing a portable personal receiving device comprising:
   a portable receiving device having a program enabling selection information to print;
   said portable device having a program to identify available printers based on the location of said receiving device; and
   a communications link for connecting said portable receiving device to an available printer,
   wherein said portable device contains a program for generation of an authentication barcode which when communicated to said printer enables said printer to print selected information.

* * * * *